Figure 3:
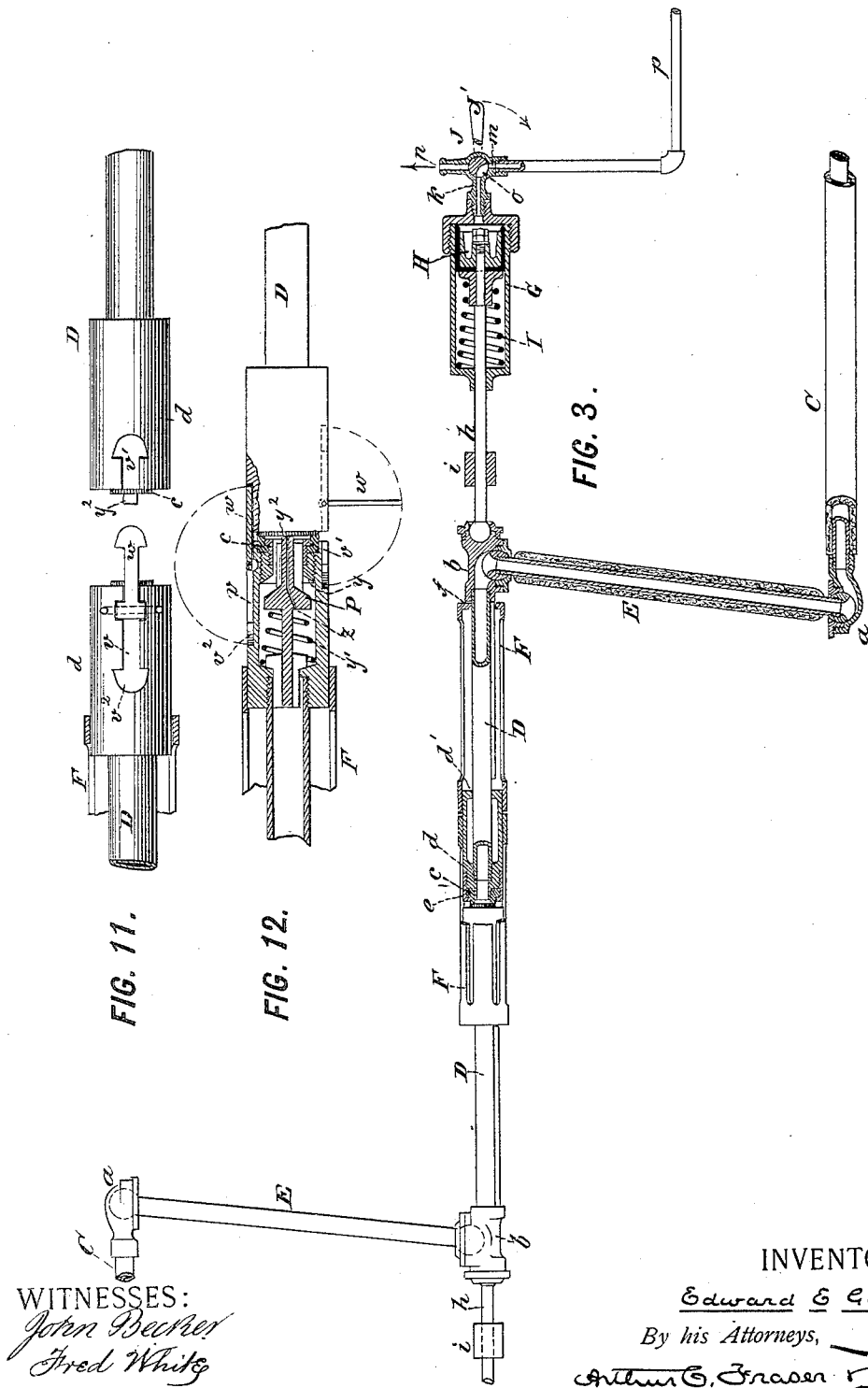

(No Model.) 4 Sheets—Sheet 1.
E. E. GOLD.
PIPE COUPLING FOR RAILWAY CARS.
No. 424,780. Patented Apr. 1, 1890.
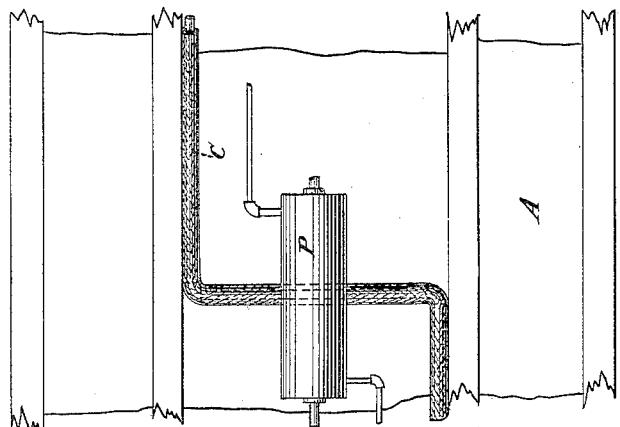
FIG. 1.
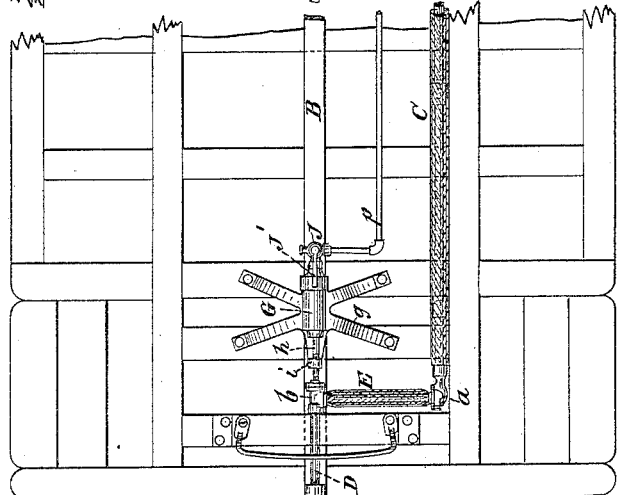
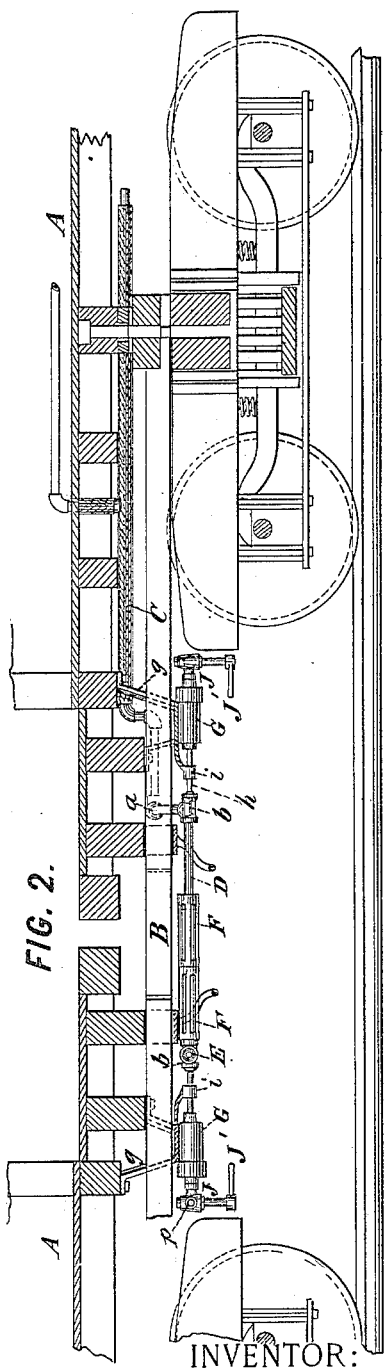
FIG. 2.
WITNESSES:
John Becker
Fred White
INVENTOR:
Edward E. Gold,
By his Attorneys,
Arthur G. Fraser & Co.

(No Model.) 4 Sheets—Sheet 3.

E. E. GOLD.
PIPE COUPLING FOR RAILWAY CARS.

No. 424,780. Patented Apr. 1, 1890.

WITNESSES:
John Becker
Fred White

INVENTOR:
Edward E. Gold,
By his Attorneys,
Arthur G. Fraser & Co.

(No Model.) 4 Sheets—Sheet 4.
E. E. GOLD.
PIPE COUPLING FOR RAILWAY CARS.
No. 424,780. Patented Apr. 1, 1890.
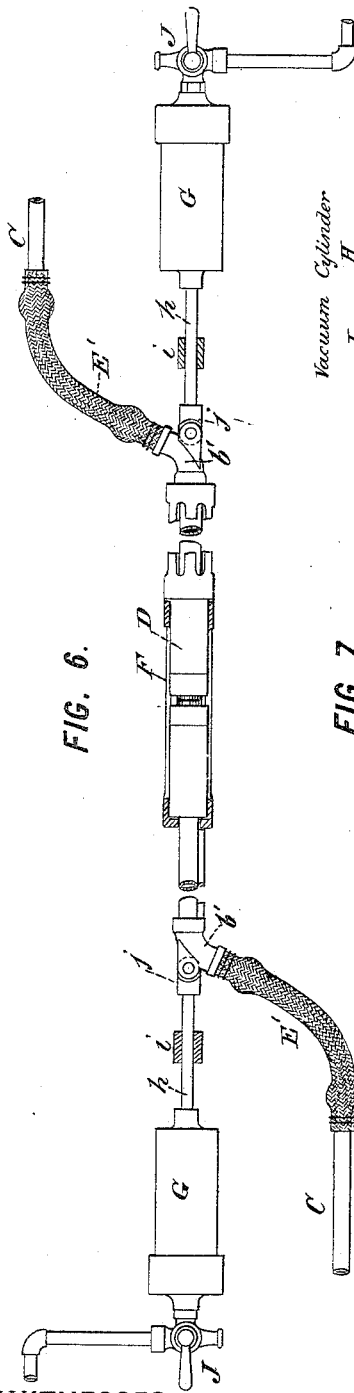
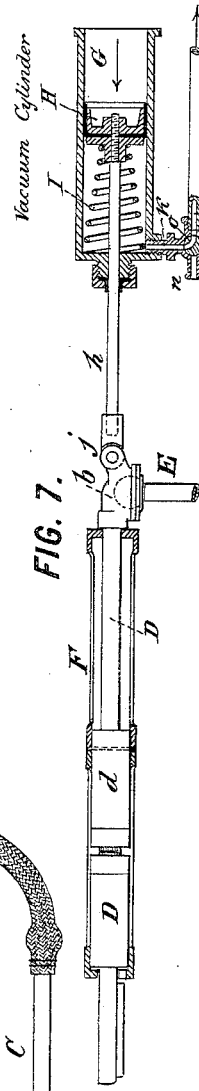
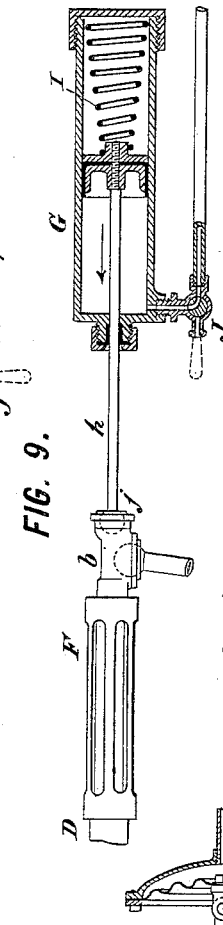
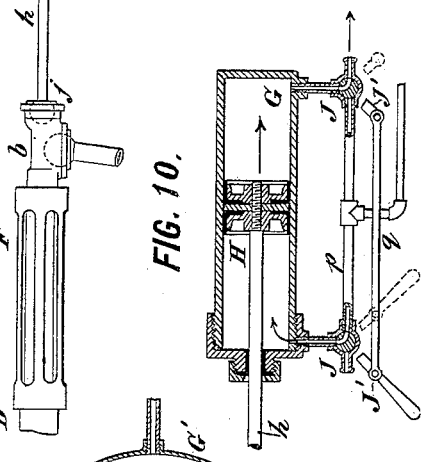
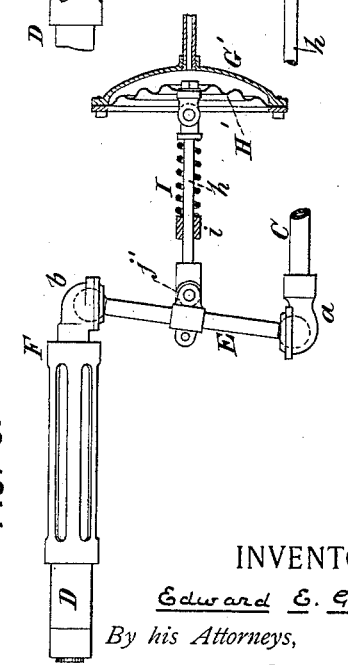
WITNESSES:
John Becker
Fred White
INVENTOR:
Edward E. Gold,
By his Attorneys,
Arthur C. Fraser & Co.

UNITED STATES PATENT OFFICE.

EDWARD E. GOLD, OF NEW YORK, N. Y.

PIPE-COUPLING FOR RAILWAY-CARS.

SPECIFICATION forming part of Letters Patent No. 424,780, dated April 1, 1890.

Application filed September 12, 1889. Serial No. 323,762. (No model.)

*To all whom it may concern:*

Be it known that I, EDWARD E. GOLD, a citizen of the United States, residing in the city, county, and State of New York, have invented certain new and useful Improvements in Pipe-Couplings for Railway-Cars, of which the following is a specification.

This invention relates to means for coupling together between the cars the pipes used on railway-trains. It is applicable to the coupling of steam or other heating pipes and of atmospheric or other brake-pipes, such as those of air-pressure or vacuum brakes.

Railway-car pipe-couplings as heretofore constructed have almost invariably been provided with means for locking together the adjoining ends of two lengths of pipes, such means consisting of coupling-heads of various constructions provided with devices for engaging one another to fasten them together in order that they may resist tensile strains tending to separate them. Such couplings are subject to the disadvantage of requiring the use of lengths of flexible hose to connect the pipes on the cars with the coupling-heads in order to give the necessary freedom of motion to permit of the interlocking movements of the coupling-heads and of the relative movements toward and from each other of the lengths of pipe on the adjoining cars, due to the relative movements of the cars; or in the case of those couplings which avoid the use of hose there is the greater disadvantage of complex telescopic arrangements of pipes and their packings and of complicated fastening provisions for uniting the coupling-heads, and there is, further, the still more serious disadvantage that couplings of the latter class have never yet been successfully constructed to uncouple automatically, as do those of the class employing lengths of pendent hose at the ends of the car.

My present invention aims to provide a means for uniting the ends of the lengths of pipe on adjoining cars which shall be free from the disadvantages inherent in the couplings heretofore applied, and in which pipes may be connected from car to car without any pendent or drooped portion at the couplings. To this end I provide the length of pipe on each car with end sections or heads constructed to be movable both longitudinally and laterally sufficiently to compensate for the movement of the cars, and I construct these sections or heads to fit against those of the adjoining cars by meeting face to face. In addition I provide means for forcing each end section or head outwardly, so that when two adjoining end sections are placed together face to face and these means are brought into action the respective heads will be forced outwardly or toward each other with a pressure sufficient to resist whatever internal pressure may be carried by the pipes. In order to enable the sections to be coupled, I further provide means for relieving or throwing off this outward pressure, so that the train-men can easily force back the end sections to bring them together end to end in line with one another in order to couple them. These means for forcing out and moving in the sections or coupling-heads consist of a pneumatic cylinder and piston or other gaseous-pressure device on the one hand and a spring or other retractile device on the other hand. By preference the pneumatic means is employed for pressing the coupling-heads outwardly and the springs for pressing them inwardly, although the reverse arrangement may be substituted. The gaseous pressure requisite to operate the couplings is derived from the usual compressed-air reservoir or storage-cylinder of air-brakes; or in the case of vacuum-brakes the atmospheric pressure is utilized by making connection between the cylinder on one side of the piston and a vacuum chamber or cylinder carried by the car. The cylinder in either case is provided with a valve or valves by which at one time it is put into communication with the source of compressed air or vacuum and at another time it is put into communication with the atmosphere in order to equalize the pressure on either side of the piston and permit the spring to act to retract the latter.

Having thus described the general features of my invention, I will now proceed to describe more particularly the preferred construction thereof and certain modified constructions by referring to the accompanying drawings, wherein—

Figure 4:
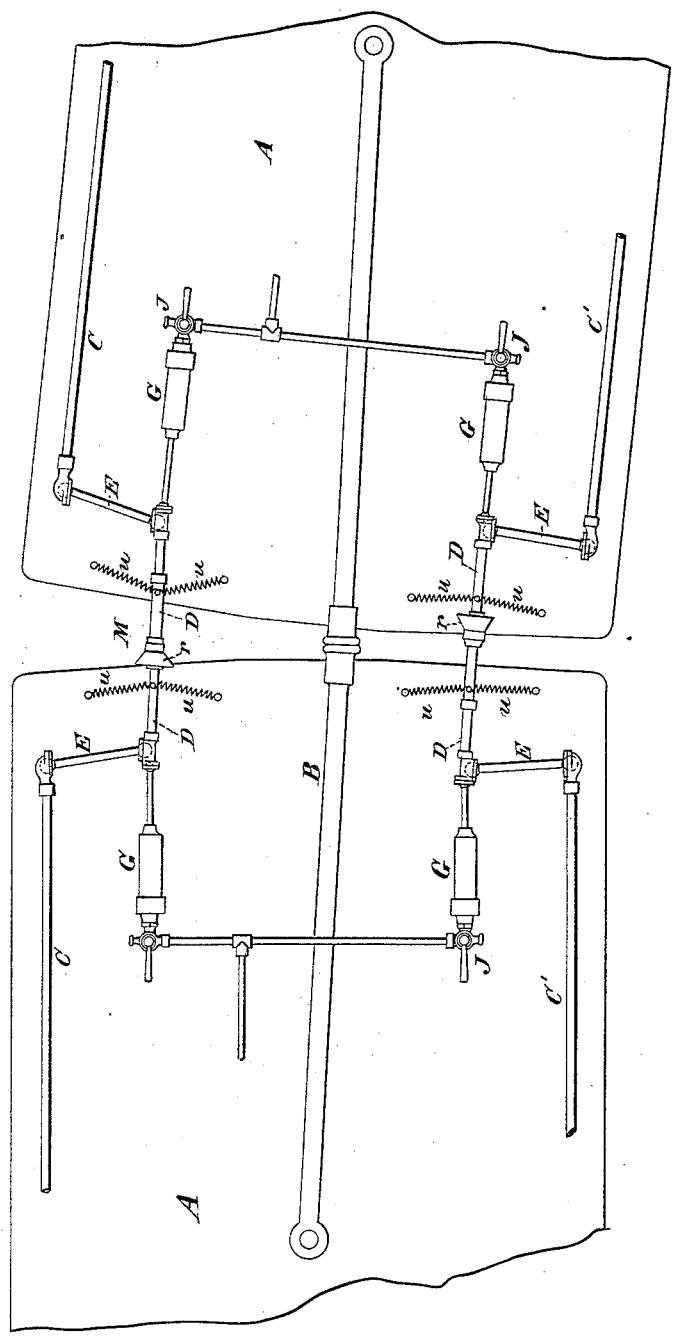
Figure 5:
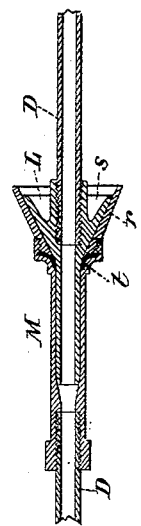

Figure 1 is an under side plan of portions of the bottoms of two adjoining cars showing their pipe systems coupled together according to my invention. Fig. 2 is a vertical longitudinal section of the adjoining portions of the cars. Fig. 3 is a sectional plan of the pipes shown in Fig. 1 on a scale three times that shown in Fig. 2. Fig. 4 is a plan of the under side of two adjoining cars, showing another means of applying my invention. Fig. 5 is a fragmentary longitudinal section, on a larger scale, of the coupling-heads shown in Fig. 4. Fig. 6 is a similar view to Fig. 3, but showing a modification of the invention. Fig. 7 is a similar view showing a further modification adaptable in connection with vacuum-brakes. Fig. 8 shows still another modification. Fig. 9 is a fragmentary sectional view showing a reversal of the previous constructions in that the couplings are pressed together by spring-pressure and thrown apart by means of compressed air. Fig. 10 shows a further modification of the air-cylinder and piston. Fig. 11 is a plan, and Fig. 12 a vertical mid-section, of the preferred form of coupling-heads.

Let A A designate the railway-cars, B the usual coupling of any suitable construction for coupling them together, and C C the pipes upon the respective cars which are to be coupled together according to my invention. These pipes may be steam-heating pipes, or pipes for conveying hot air or water or other fluid for heating the cars; or they may be the pipes of atmospheric or other fluid pressure brakes, or any other pipes which it is desired to couple together between any two cars of a train.

The length of pipe C on each car is provided at its opposite ends with coupling-heads D D. These heads in the construction shown consist of sections of pipe adapted to fit together at their ends, either by entering one within the other or by coming together with their ends face to face. The sections D D are so mounted and connected to the rigid lengths of pipes C that they are free to move in and out longitudinally of the car and angularly to either side, and also to a sufficient extent angularly up or down. These movements are necessary to adapt them to the relative movements of the bodies of the two adjoining cars.

The preferred means for connecting the sections or heads D D to the rigid portion C is that shown in Figs. 1, 2, and 3. It consists of an intermediate section E, jointed at one end to the rigid pipe C by a ball-and-socket joint $a$ and at the other end to the head-section D by a ball-and-socket joint $b$. These ball-and-socket joints may be of any known or suitable construction, that shown in Fig. 3 answering the purpose well. The end sections D D come together end to end and in line with one another and they are held in line by sliding a sleeve F over their abutting ends, so that when thus connected and so long as they are pressed toward each other with their abutting ends in firm contact they constitute for the time being a single rigid bar or pipe. This rigid bar or pipe is supported at the ball-and-socket joints $b$ $b$ at its opposite ends, so that whatever may be the movement of the adjoining car-bodies relatively to one another the pipe or bar thus constituted will extend in a direct line between these two points of support and by reason of the freedom of motion at the joints will accommodate itself to the movements of the cars.

The ends of the sections or coupling-heads D D are faced each with a seat $c$ of suitable yielding substance or composition, or any other construction of seating face may be substituted therefor. The construction thus far described, which is deemed preferable, is shown in Fig. 3, wherein the section D consists of a short length of pipe screwed at one end into the shell of the ball-and-socket joint $b$ and having a cylindrical head or boss $d$ screwed on its other end. The packing $c$ is held on the outer reduced end of this head $d$, being retained in place by a thimble $e$ screwed thereon. The head $d$ extends far enough back on the pipe D to form a bearing for the sleeve F, by which the two coupling heads or sections are held in line, and it terminates at its rear end in a shoulder $d'$. Each of the heads D is provided with a sleeve F, which may be slid back against the ball-and-socket joint $b$, or may be slid out over the head $d$ of the adjoining section, and when so slid out its inturned flange $f$ strikes the shoulder $d'$ and limits its outward movement, so that it cannot slip off. The construction thus described is not, however, essential to my invention and may be greatly varied.

In connection with each coupling head or section D are a cylinder G and a piston H, arranged, preferably, with their axes longitudinally of the car and with the piston-rod $h$ connected mechanically to the movable section or head, so that the thrust of the piston can be transmitted through this rod to the coupling-head. This is on the assumption that the cylinder is fixed to the car-body or other support and the piston is movable within it, as is usual, although the inverse arrangement might be employed. The air pressure or vacuum is utilized to press the piston in one direction and a spring I to move it in the other. Other known retractile means might be substituted for the spring. Preferably the air-pressure is arranged to act upon the rear or inner side of the piston to force it outwardly, so that its pressure shall act upon the coupling-heads to hold them together, and the spring is arranged to press the piston in the opposite direction in order to separate the coupling-heads.

The preferred construction is that shown in Figs. 1, 2, and 3. The cylinder G is fastened to the car-bodies through the medium of a bracket or chain $g$, which straddles the draw-bar. The piston H has a cupped-leather packing to prevent leakage of the air-pressure around it, and the spring I is seated within the cylinder and presses directly against the piston. The piston-rod $h$ passes out through the end of the cylinder, being guided therein, and its other end passes through a guiding-bar $i$ and is connected with the ball-and-socket joint $b$, preferably by being formed with a ball on its end embraced by a socket $j$, forming part of the shell or socket of the joint $b$. A universal connection is thus provided between the end of the rod and the pipe-section or coupling-head D, so that the latter can be turned angularly in any direction to a sufficient extent while being supported by the ball-and-socket connection $j$.

A cylinder G is connected by a pipe or passage $k$ with a three-way cock J, having a compressed-air-inlet port $m$ on one side and an outlet $n$ to the open air on the other side, and the plug of which, which is turned by the handle J', is formed with a quarter-round groove or port $o$, adapted to connect the port $k$ with either of the ports $m$ or $n$, but incapable of connecting the two latter together. A pipe $p$ is connected to the port $m$ and leads to a compressed-air chamber or reservoir P, which may be the compressed-air reservoir of the usual air-pressure brakes or a separate cylinder. When the cock J is turned to the position shown in Fig. 3, there is free communication between the compressed-air reservoir and the interior of the cylinder G, and the compressed air enters the latter and presses the piston H outwardly. This is the normal condition of affairs while the cars and their pipes are coupled. Thus the pressure in the two cylinders G on opposite sides of the coupled sections D D being communicated to the latter at the joints $j\,j$ acts continually to hold them pressed together, while they remain freely suspended between these two joints and extending in a direct line between them. If the pipes C C contain a fluid-pressure, the area of the pistons H H should be so proportioned to the air-pressure in the reservoirs P as to exert a pressure against the opposite ends of the sections D D sufficient to hold the ends together against the internal pressure tending to escape between them. As the car-bodies, and consequently the cylinders G G, move relatively toward and from each other, in accordance with the greater or less compression of the draw-bar and buffer-springs, the pistons H H play back and forth in the cylinders, while maintaining their uniform pressures against the sections D D. As the piston H is forced back the air in the cylinder behind it is compressed thereby to greater extent and a backflow is instituted through the ports $k$ $o$ $m$ and pipe $p$ to the cylinder P. As the car-bodies draw apart again the air-pressure forces the piston H outwardly, and as the pressure behind it becomes less than that in the cylinder P a return flow of air occurs from P into G.

When the cars are uncoupled and are drawn apart, my improved coupling uncouples automatically, since the pistons H H can move out only until stopped against the outer ends of the cylinders, after which the further movement apart of the car-bodies results in the separation of the two coupling-heads D D. These heads will then drop until they rest upon arc-shaped guiding-rods $i\,i$, or some other suitable support, or they may be unsupported and hang pendent from the joints $j\,j$.

When two cars are coupled together, a train-man will effect the coupling of the sections D D by turning the handles of the cocks J J, so as to permit the compressed air to escape from the cylinders G G through the ports $k$ $o$ $n$ to the outer air, whereupon the springs I I will force the pistons inwardly, and thereby draw back the sections D D far enough to enable them to be brought end to end by the train-man, who will then slip the sleeve F from one of the sections over onto the end of the other section, and then by turning back the cocks J J and admitting the full pressure of compressed air against the pistons he will cause the two sections to be pressed firmly together.

The coupling operation is very simple and requires no particular strength, since the only work to be done by the train-man is the turning of the cocks and the lifting of the sections D D into line and the sliding of the sleeve F from one onto the other, all of which is the work of a moment.

The sleeves F F are preferably made with long slots or perforations to permit free escape of any leakage or water of condensation that may force its way through the joints between the abutting ends of the sections D D.

The cocks J J cannot be possibly turned so as to permit the escape of the air from the pipe $p$ to the atmosphere. They should, however, be provided with stops, such as are usual on three-way cocks, to prevent them being turned too far. The cock J may be placed in any convenient position wherever it can be most easily reached by the train-man or a separate handle or rod may be arranged in convenient position to be operated by the train-man, and may serve to communicate motion to the plug of the cock. The handle J' may be placed either above or below the car-floor.

In order to provide for the possible contingency that the pneumatic device may get out of order and become inoperative, I prefer to provide the coupling-heads with means for effecting their engagement by hand and independently of the pneumatic pressure when desired. One such means, and that which is preferred of those thus far designed by me, is shown in Figs. 11 and 12. The head $d$ of the coupling-head D is recessed at $v\,v'$ on diametrically-opposite sides, and in the recess $v$ is pivoted a flat link, bar, or plate $w$, having a winged or hooked head. This link is normally turned back into the recess $v$, so that its winged head lies in the enlargement $v^2$ thereof. The link lies flush with the surface of the head, so that it does not interfere with the sliding over of the sleeve F. In case of the failure of the pneumatic mechanism the train-man will turn out both the links $w$ on the two adjoining coupling-heads, so that each link overhangs the other head and the two are on diametrically-opposite sides. The hooked end of each link enters into the recess $v'$ on the other head, with its wings or shoulders engaging shoulders in the enlargement thereof, so that the pulling apart of the two coupling-heads is thus prevented. The sleeve F is then slid over the two links, so that it serves not only to hold the coupling-heads in line, but also to keep the links in engagement with the recesses $v'$. The temporary hand-applied fastening thus devised will hold the two sections or heads together and make a sufficiently tight joint until the cars reach a point where the pneumatic mechanism can be repaired.

Figs. 11 and 12 show also a check-valve P, arranged in each coupling-head and closing outwardly against a seat $y$ under the tension of a spring $y'$. The stem $y^2$ of this valve protrudes beyond the face of the seat $c$ when the valve is seated, so that when the two coupling-heads come together these protruding stems $y^2$ by their mutual abutment force each other back and open the valves P against the pressure of their springs $y'$, thereby permitting the free passage of steam through the connected coupling-heads. When the couplings are uncoupled, these valves automatically close, so that the last car left on the train has its steam or air pipe C closed to prevent the escape of the pressure therefrom.

In order to provide for the drainage off of the water of condensation in the case of steam-heating pipes, I form a minute bore $z$—say about one sixty-fourth of an inch in diameter—through the valve P; but if the coupling is used for air-pipes this will be omitted.

Fig. 6 shows a construction wherein a rigid length of pipe C and the coupling head or section D are connected flexibly together through the medium of a length of hose E', instead of by a rigid section of pipe E and its ball-and-socket joints $a$ $b$, as in the construction already described. The section D terminates in an elbow $b'$, to which the end of the hose is clamped, and the end of the piston-rod $h$ is connected to this elbow by a joint $j'$ of any suitable construction. In other respects the construction and operation are the same as in the form of my invention already described.

Fig. 7 shows a modification wherein the piston H is acted on by a vacuum instead of by compressed air. The cylinder G is open at its inner end for the free admission of atmospheric pressure, and at its outer end it is connected with the three-way cock J, the port $m$ of which is in communication with the pipe $p'$, leading to a vacuum-chamber or other reservoir or vessel, the pressure in which is reduced below that of the atmosphere. When the cock is turned to the position shown, the atmospheric pressure escapes from the outer end of the cylinder G, producing a partial vacuum therein, and the pressure of the atmosphere forces the piston H outwardly, thereby compressing the spring I and forcing the coupling sections or heads D D together. On turning the cock J to the opposite position atmospheric air enters through the ports $n$ $o$ $k$ into the cylinder, establishing an equilibrium therein and causing the spring I to press back the piston.

Fig. 8 shows the substitution for a pneumatic cylinder and piston of a well-known equivalent thereof—namely, the chamber G' and diaphragm H', the latter connected through the rod $h$ to the coupling-head. Owing to the comparatively limited range of movement of a diaphragm, however, this connection is not made directly, but through a lever, which magnifies the movement before transmitting it to the coupling-head. In the construction shown the pipe-section E constitutes this lever. Other means for converting gaseous pressure into a mechanical pressure which can be transmitted to the coupling-heads may be substituted for the cylinder and piston as equivalents thereof.

In Fig. 9 I have shown a reversal of the functions of the gaseous pressure and the spring I, since the latter is arranged to force the piston outwardly, and thereby to press the sections of the coupling together, while the gaseous pressure is used to retract the spring in order to draw back the coupling-heads to enable them to be brought end to end in coupling. The operation of the cock J is the same as before described, the only difference being that the compressed air is admitted at the opposite end of the cylinder, and the cupped packing of the piston H is turned in the opposite direction. During ordinary running the air-pressure is turned off and the outer end of the cylinder put in communication with the atmosphere, as shown.

Fig. 10 shows how the retracting spring may be omitted and another retractile force substituted for it, this force in the present instance being compressed air. The piston H is made with two cupped packings turned in opposite directions, and two cocks J J are connected to the opposite ends of the cylinder G, their handles J' being connected together through a rod $q$, so that by turning one cock the other is turned also. In one position of the cocks the compressed air from the pipe $p$ enters the outer end of the cylinder, as shown, while the inner end of the cylinder is put in communication through the other cock with the outer air, so that the piston is retracted in order to enable the coupling to be applied. By throwing the handles of the cocks over to the positions shown in dotted lines the compressed air will enter the inner end of the cylinder and its outer end will be put in communication with the atmosphere, thereby pressing the piston outwardly to force the coupling-heads together.

In the constructions thus far described only one pipe has been referred to on each car to be coupled with a pipe on the adjoining car. In some systems of piping, however, it is necessary to couple two or even more pipes together from car to car. For example, in some systems of steam heating a steam-pipe is carried from the locomotive-boiler through the train, and a return-pipe is carried from the rear of the train back from car to car to the locomotive. My present invention lends itself readily to such two-pipe systems. It is also applicable to the construction of pipe-couplings which shall couple automatically as the cars come together. These two features are shown in Figs 4 and 5.

Referring to Fig. 4, C C are the sections of pipe extending along one side of the cars or train, and C' C' are the sections of the other or return pipe extending along the opposite side of the cars. The ends of the respective pipes C' C' are connected through short sections E E, as before, with the coupling-sections D D, the latter being brought in nearer to the middle of the car-bodies and as close together as they can be without interfering with the lateral swing of the car-coupling or draw-bars in case they are arranged on the same level as the latter. If arranged on a different level, they may be approached as closely together as is desired.

In order to make the coupling-sections self-coupling, they are constructed of the male and female order, as shown—a construction which is in general already known. One of the sections D terminates in a tubular section M, which has a trumpet-shaped or flaring mouth $r$, and the other section D terminates in a nozzle-piece L, constructed to enter within the section M for a sufficient distance to guide the two heads and hold them in line, and is formed with a conical base $s$, which fits tightly within the trumpet-mouth $r$, a cupped packing $t$ being provided to prevent leakage, as shown in Fig. 5. Of the two coupling-heads D D at each end of each car one is a male and the other a female, and the male head on one end of the car is arranged on the opposite side of the car from the male head at the other end, all of the cars being alike in this respect, so that any car may be turned end for end without altering the relation of its male and female heads, respectively, to those on an adjoining car. Thus, as the cars come together, the proper presentation of a male head to be coupled to a female head is assured. Some suitable means must be provided in order to insure the self-coupling of the heads for holding the respective heads in line with each other as the cars come together, so that the heads shall properly enter the one within the other. Many different means may be provided for effecting this result. As suggestive of one such means, I have shown spiral springs $u$ $u$ connected to each of the sections D and acting to draw the latter into an intermediate position, where they stand longitudinally of the car. The air-pressure may normally be kept turned into the cylinders, which are assumed to be of the construction shown in Fig. 2, so that the coupling-sections D D are continually pressed out. When the cars come together, the engagement of the respective sections will force them reciprocally backward or inward. If, however, any pair of sections should fail to come together properly in line, they can be coupled by hand after the train is made up by turning the cocks J J, controlling their cylinders, whereby they are retracted farther to enable them to be fitted together.

My invention may be modified in other respects than those herein described by the substitution for any of the described elements of their mechanical equivalents, by the adoption of different details of construction, and by other changes, such as will be apparent to constructive engineers.

I claim as my invention the following-defined novel features or improvements, each substantially as hereinbefore specified, namely:

1. In a pipe-coupling for railway-cars, the combination, with the car, of a tubular coupling-head, having a seat adapted for engagement with a reciprocal coupling-head on an adjoining car, movable relatively to the car, and means for so moving it, consisting of a cylinder and piston or equivalent device adapted to be acted on by gaseous pressure, and a valve under the control of a train-man for determining the admission of gaseous pressure thereto.

2. In a pipe-coupling for railway-cars, the combination, with the car, of a tubular coupling-head having a seat adapted for engagement with a reciprocal coupling-head on an adjoining car, movable relatively to the car, and means for moving it, consisting of a cylinder and piston or equivalent device adapted to be acted on by gaseous pressure for imparting motion in one direction and a retractile device for imparting motion in the opposite direction.

3. In a pipe-coupling for railway-cars, the combination, with the car, of a tubular coupling-head having a seat adapted for engagement with a reciprocal coupling-head on an adjoining car, movable relatively to the car, and means for pressing it against the reciprocal coupling-head, consisting of a cylinder and piston or equivalent device adapted to be acted on by gaseous pressure and connected to said head to transmit the pressure thereto in the direction for forcing it toward the reciprocal coupling-head, and a valve under the control of a train-man for determining the admission of gaseous pressure to said cylinder.

4. In a pipe-coupling for railway-cars, the combination, with the car, of a coupling-head movable longitudinally, pneumatic means for pressing it outwardly against the reciprocal coupling-head, consisting of a cylinder and piston or equivalent device adapted to be acted on by gaseous pressure and connected to the head, a valve for determining the admission of gaseous pressure thereto, and a spring for drawing the head inwardly when the gaseous pressure is relieved.

5. In a pipe-coupling for railway-cars, the combination, with the car, of a tubular coupling-head having a seat for engagement with a reciprocal coupling-head on an adjoining car, movable relatively to the car, and means for so moving it, consisting of a cylinder and piston or equivalent device adapted to be acted on by gaseous pressure, a reservoir or chamber for compressed or rarefied air or gas, a pipe or passage affording communication between said reservoir and cylinder, and a three-way cock constructed when in one position to open communication between the cylinder and reservoir and in another position to put the cylinder in communication with the outer air, whereby when in the former position the compressed gas may flow between the reservoir and cylinder, and thereby maintain an approximately uniform pressure in the latter notwithstanding the movements of the piston resulting from the movements of the coupling-head due to the relative changes of position of the two coupled car-bodies.

6. In a pipe-coupling for railway-cars, the combination, with the car, of a coupling-head movable relatively to the car and pneumatic means connected to it for pressing it in the direction to hold it in firm contact with the coupling-head on an adjoining car, such means consisting of a cylinder and piston or equivalent device adapted to be acted on by gaseous pressure and movable to compensate for the movements of the coupling-head incidental to the relative movements of the coupled cars, whereby the heads are pressed tightly together notwithstanding the movements of the cars toward or from each other.

7. In a pipe-coupling for railway-cars, the combination, with the car, of a coupling-head movable relatively thereto, a cylinder, a piston movable therein, with its piston-rod extending outside the cylinder, and a flexible or universal joint between the end of said rod and the coupling-head, whereby when two reciprocal coupling-heads are united they may be pressed together by pressure communicated to them through the piston-rods, and they are movable in all directions between the universal joints to accommodate them to the relative movements of the two car-bodies.

8. In a pipe-coupling for railway-cars, the combination, with the car, of a coupling-head movable relatively thereto, consisting of a section of pipe flexibly connected at its inner end to the fixed pipe on the car and provided at its outer end with a seating-face adapted to seat against the end of a reciprocal coupling-head, a universal joint supporting the inner portion of the section, guides adapted to engage the respective coupling-heads and hold them in line, whereby the two connected heads or sections are movable in all directions between the universal joints to accommodate them to the relative movements of the two car-bodies, and means for pressing the coupling-head outwardly against the reciprocal coupling-head, constructed to apply the pressure in a direct line between said universal joints.

9. In a pipe-coupling for railway-cars, the combination, with the car, of a coupling-head movable relatively thereto, and consisting of a section of pipe and a sleeve movable over said section and beyond the end thereof, whereby it is adapted to slip over the head of a reciprocal coupling-head and hold the two in line, and said sleeve formed with slots or openings for permitting the escape of leakage from between the abutting faces of the two heads.

10. In a pipe-coupling for railway-cars, the combination of a coupling-head formed with recesses, a fastening link or hook pivoted in one of said recesses and the other recess constructed to receive a similar link on a reciprocal coupling-head, and a sleeve movable over the coupling-head and beyond the end thereof, whereby it is adapted to slip over the end of a reciprocal coupling-head and hold the two in line and retain their links in engagement with said recesses.

11. In a pipe-coupling for railway-cars, the combination, with the car, of a coupling-head consisting of a section of pipe or tube with its seating-face at the end thereof, a sleeve movable over said section and beyond its end in order to slip over the end of a reciprocal coupling-head and hold the two in line, and a check-valve mounted in said coupling-head and closing outwardly with a spring to press it outwardly, and a stem projecting when it is seated beyond the seating-face at the end of the coupling-head, whereby when the head is coupled with a reciprocal coupling-head the protruding stems will mutually press each other back and unseat the check-valves.

In witness whereof I have hereunto signed my name in the presence of two subscribing witnesses.

EDWARD E. GOLD.

Witnesses:
GEORGE H. FRASER,
ARTHUR C. FRASER.